United States Patent [19]

Downs et al.

[11] 4,360,271
[45] Nov. 23, 1982

[54] INTERFEROMETER SYSTEMS

[75] Inventors: Michael J. Downs, Headley Down; Kenneth W. Raine, Twickenham, both of England

[73] Assignee: National Research Development Corporation, London, England

[21] Appl. No.: 167,066

[22] PCT Filed: Jan. 11, 1979

[86] PCT No.: PCT/GB79/00006
§ 371 Date: Sep. 13, 1979
§ 102(e) Date: Aug. 9, 1979

[87] PCT Pub. No.: WO79/00506
PCT Pub. Date: Aug. 9, 1979

[30] Foreign Application Priority Data

Jan. 13, 1978 [GB] United Kingdom ............... 01448/78

[51] Int. Cl.³ .................................................. G01B 9/02
[52] U.S. Cl. ..................................... 356/351; 356/358
[58] Field of Search ................................ 356/351, 358

[56] References Cited

U.S. PATENT DOCUMENTS

| 3,529,894 | 9/1970 | Hock | 356/351 |
| 3,601,490 | 8/1971 | Erickson | 356/351 |
| 3,771,875 | 11/1973 | Russo | 356/351 |
| 3,822,942 | 7/1974 | Hock | 356/351 |
| 3,881,823 | 5/1975 | De Lang | 356/351 |
| 3,976,379 | 8/1976 | Morokuma | 356/351 |

FOREIGN PATENT DOCUMENTS

| 2111936 | 9/1971 | Fed. Rep. of Germany | 356/351 |
| 1534841 | 6/1968 | France . | |
| 2375577 | 7/1978 | France . | |
| 1076835 | 7/1967 | United Kingdom . | |
| 1126744 | 9/1968 | United Kingdom . | |
| 1309378 | 3/1973 | United Kingdom . | |
| 1345204 | 1/1974 | United Kingdom . | |

OTHER PUBLICATIONS

Harrison, "Coaxial Laser-Interferometer," *IBM Tech. Discl. Bull.*, vol. 14, No. 7, pp. 1949-1950, 12/71.
Vyskub et al., "Beam Splitter With 90° Phase Shift for Interference Displacement Measuring Instruments" *Instruments & Eaptl., Technique* (SU), vol. 20, No. 4/2, pp. 1151-1153, 8/77.

Primary Examiner—John K. Corbin
Assistant Examiner—Matthew W. Koren
Attorney, Agent, or Firm—Cushman, Darby & Cushman

[57] ABSTRACT

In a Michelson interferometer system arranged to give four output interferograms, two at each orthogonal direction of polarization, the reflection and transmission coefficients of the interferometer beam splitter (10) at the two polarization directions are chosen so that the ratios of the a.c. component to the d.c. component are equal in three of the interferograms. Difference signals derived from the three interferograms are suitable for use with an automatic, reversible, fringe counting system.

7 Claims, 9 Drawing Figures

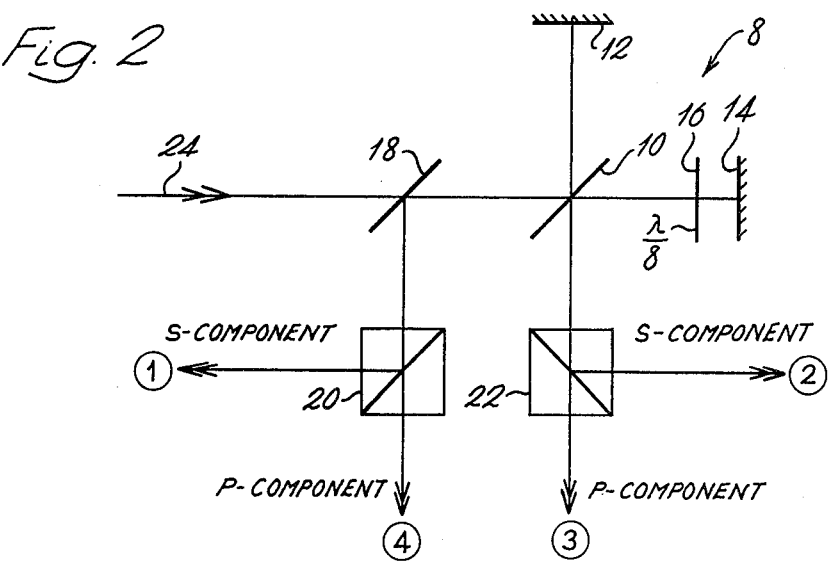

Fig. 2

TABLE II
INTERFERING AMPLITUDES

| | $\alpha_1$ | $\alpha_2$ |
|---|---|---|
| ① | $k_1 A R_S$ | $k_2 A T_S$ |
| ② | $k_1 A \sqrt{R_S T_S}$ | $k_2 A \sqrt{R_S' T_S}$ |
| ③ | $k_1 A \sqrt{R_P T_P}$ | $k_2 A \sqrt{R_P' T_P}$ |
| ④ | $k_1 A R_P$ | $k_2 A T_P$ |

TABLE I
INTERFEROMETER BEAM SPLITTER COEFFICIENTS $R_S$ (AIR SIDE) REFLECTANCE
  S-COMPONENT $R_S'$ (SUBSTRATE SIDE) REFLECTANCE
  S-COMPONENT $R_P$ (AIR SIDE) REFLECTANCE
  P-COMPONENT $R_P'$ (SUBSTRATE SIDE) REFLECTANCE
  P-COMPONENT $T_S$ TRANSMITTANCE
  S-COMPONENT $T_P$ TRANSMITTANCE
  P-COMPONENT $k_1, k_2$ ARE CONSTANTS RELATED TO THE TRANSMISSIVITY OF THE OPTICAL PATHS AND THE AREAS OF THE INTERFERING BEAMS

INTERFEROMETER SYSTEMS

This invention relates to displacement-measuring interferometers, more especially to Michelson interferometers arranged to provide an output suitable for use with an automatic reversible fringe counting system.

Use of a reversible fringe counting system allows automatic correction for any vibration or retraced motion. Conventional systems require two electrical input signals which vary sinusoidally with path difference in the interferometer, which are in phase quadrature, and which ideally have fixed amplitudes.

Usually the signals are provided by photodetectors each arranged to sense an interferogram, that is, a part of an interference fringe pattern which changes as the optical path difference in the interferometer changes.

In many prior art arrangements, interferograms are generated which each comprise a regularly alternating component, which will be referred to as an a.c. component and which is dependent on path difference between its two constituent light beams, and a component which will be referred to as a d.c. component which does not alternate regularly and does not depend on the path difference.

The magnitude of the d.c. component depends on variations in the alignment and relative sizes of the interfering beams, attenuation in one or both interferometer arms, losses due to limiting apertures, and on intensity fluctuations of the light source, so that this component cannot be removed by simple subtraction. If the d.c. component increases to a certain level, operation of the fringe counting system may not be possible.

In U.S. Pat. No. 3,771,875, Russo, an arrangement is disclosed in which three interferogram signals are provided which can be combined by sum and difference to give two purely a.c. components with no d.c. contribution. However, in the Michelson interferometer, in the measuring arm the radiation is at one direction of polarisation, and in the reference arm it is at the orthogonal direction of polarisation. The disadvantage of this is that the interferometer beam splitter must be constructed so that an area of its surface is polarising and the remaining area is non-polarising; further the non-polarising area must have values of reflectance and transmittance which are the same for each state of polarisation; this is a difficult condition to achieve.

It is an object of the invention to provide an interferometer system capable of supplying two signals which vary sinusoidally with fixed amplitude as a function of path difference, which are in phase quadrature, in which any signal level changes not related to path difference are substantially eliminated, and in which the interferometer beam splitter is relatively easy to make.

According to the invention, an improved interferometer system comprises:
  a Michelson interferometer comprising an interferometer beam splitter and two reflecting means arranged to receive radiation from opposite sides of the beam splitter and to return radiation to those sides whereby two exit beams of radiation are provided, one from each side of the beam splitter;
  a beam splitting and polarising means arranged to receive one exit beam and to separate the received radiation into radiation at two orthogonal directions of polarisation whereby two optical interferograms are provided;
  means arranged to receive the other exit beam and to separate from it radiation at one of said orthogonal directions of polarisation whereby a third optical interferogram is provided;
  the third interferogram being in phase quadrature with one of the first and the second interferograms, and being in antiphase with the other of the first and the second interferograms;
  characterised in that the interferometer beam splitter has for radiation at each orthogonal direction of polarisation reflection coefficients on its two faces which are equal, and has for radiation at one orthogonal direction of polarisation a transmission coefficient which is equal to its reflection coefficient.

The effect of this equality of the coefficients is that, as will be explained in detail below, three interferograms can be provided having the same ratio of the a.c. to the d.c. component.

It has been stated that the three interferograms must be in a phase quadrature or antiphase relationship with one another. While the system operates most effectively, so far as the signal-to-noise ratio is concerned, when the interferograms differ in phase by, ideally, 90° and 180°, the system can operate when the phases differ considerably from the ideal situation. Depending on the accuracy required, the quadrature relationship may be from 89° to 91° with no significant decrease in accuracy, may be from 75° to 150° if lower accuracy is acceptable, and the system may still be operable when the phase difference is 50° or 130°.

Further, it has been stated that three of the reflection and transmission coefficients of the interferometer beam splitter must be equal. While the tolerance in this equality is not as wide as the tolerance on phase relationships, it is not essential for operation of the system to have precise equality, although this will obviously be the preferred condition.

In one arrangement of the interferometer the two reflecting means each comprise a plane reflector, and the means to receive the other exit beam comprises a further beam splitter arranged to reflect that beam to a second beam splitting and polarising means. Four interferograms are available with this arrangement, and three are selected, depending on which coefficients of the interferometer beam splitter have been equalised. The reflectors will usually be plane mirrors.

In another arrangement of the interferometer the two reflecting means each comprise a retro reflector such as a corner cube, and the means to receive said other exit beam comprises a polariser arranged to allow passage of light in one of the two orthogonal directions. In practice the use of corner cubes is preferred because the system is insensitive to tilt of the reflectors and light is not reflected back to the source. The corner cubes can be coated so that the reflections do not introduce unwanted polarisation effects.

Regarding the requirement that one interferogram is respectively in phase quadrature and in antiphase with the other two interferograms, this may be achieved by:
  (a) arranging that the interferometer beam splitter provides the required phase difference;
  (b) the combination of an interferometer beam splitter that would normally produce a 180 or zero degree phase difference between reflected and transmitted orthogonal polarisations, with an eigth-wave plate in the optical path between the interferometer beam splitter and one of the plane reflectors, radiation passing through the plate twice;

(c) the combination of an interferometer beam splitter providing a 180 or zero degree change with a quarter-wave plate in the optical path between the interferometer beam splitter and one of the corner cube reflectors, radiation passing through the plate only once; or (d) the combination of an interferometer beam splitter which produces a phase difference between the orthogonal polarisations which differs from 180° or 0°, with a complementary phase plate of thickness suitable for either one or two passages of the radiation so that the sum of the phase changes gives phase quadrature.

Although three interferograms have now been provided in which the ratios of the a.c. component to the d.c. component are equal, it is a preferred but not essential further condition that the overall magnitudes of the three interferogram signals are equal. The interferograms are usually sensed by respective photosensitive detectors, and it is preferable if these detectors can be coupled to amplifiers having equal gains so that any electronic drift will tend to be the same for each signal. This condition can be achieved by the use of a variable optical attenuator between the interferometer outputs and each photocell; in this case the light beam illuminating the interferometer must comprise components at the said two orthogonal directions of polarisation of approximately equal magnitude. Alternatively, when corner cubes are used, the relative intensities of light in the two orthogonal directions of polarisation can be adjusted to provide three interferogram signals of equal magnitude.

The invention will now be described by way of example with reference to the accompanying drawings in which:

FIG. 2 illustrates an interferometer according to the invention;

Figure 1A:
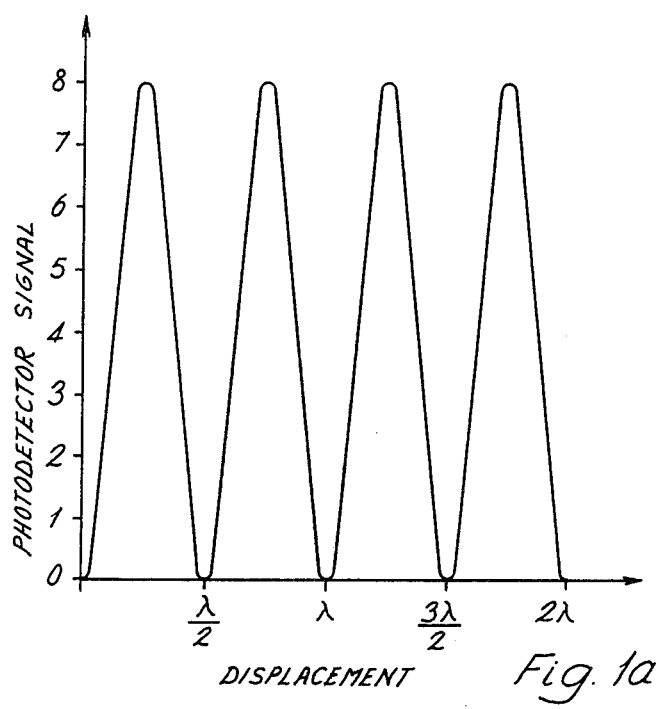
FIG. 1(a) illustrates an interferogram signal having optimum fringe contrast.
Figure 3A:
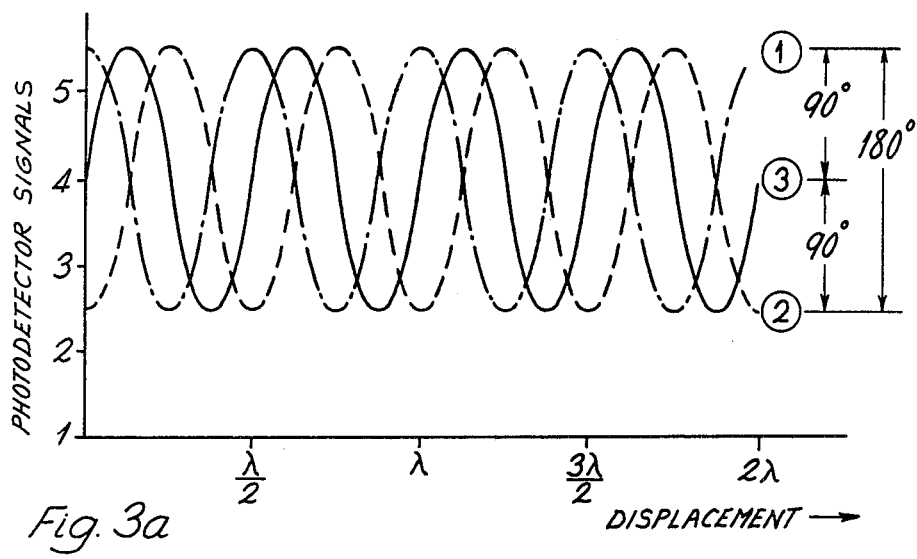
Figure 3B:
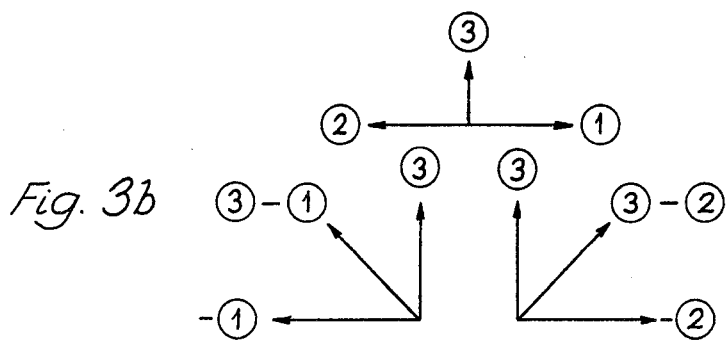
Figure 3C:
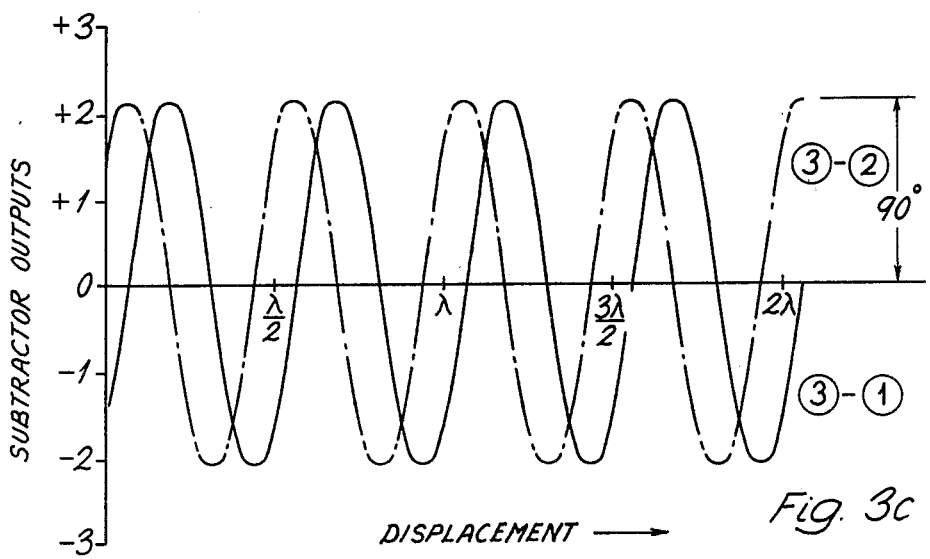
Figure 4:
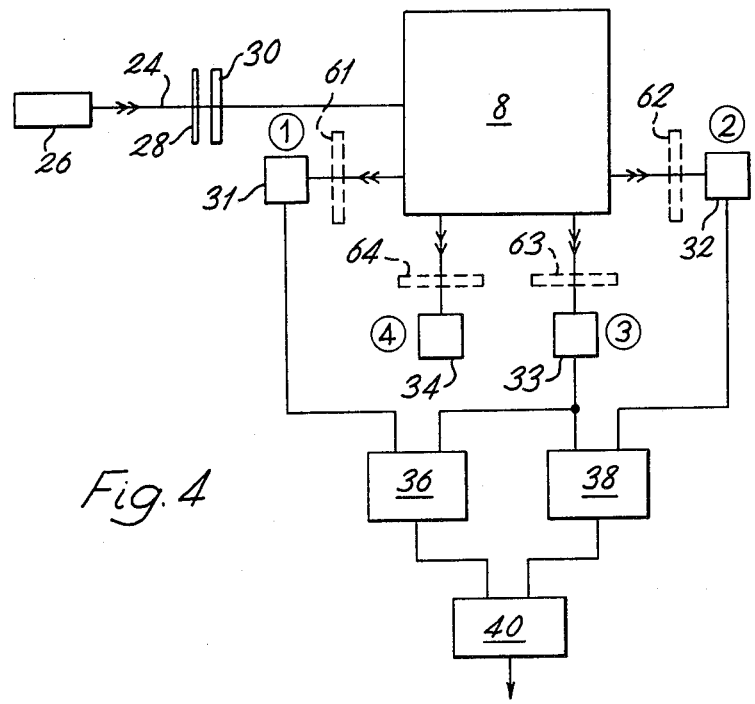
Figure 5:
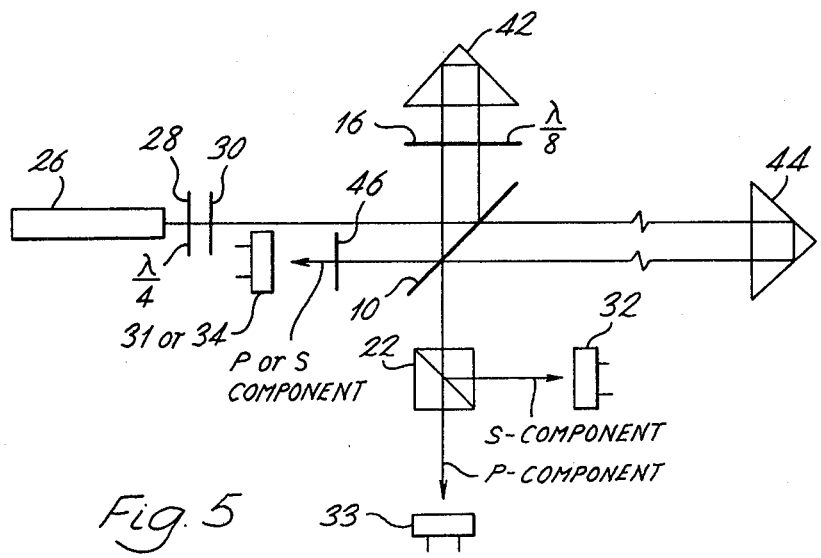
Figure 6:
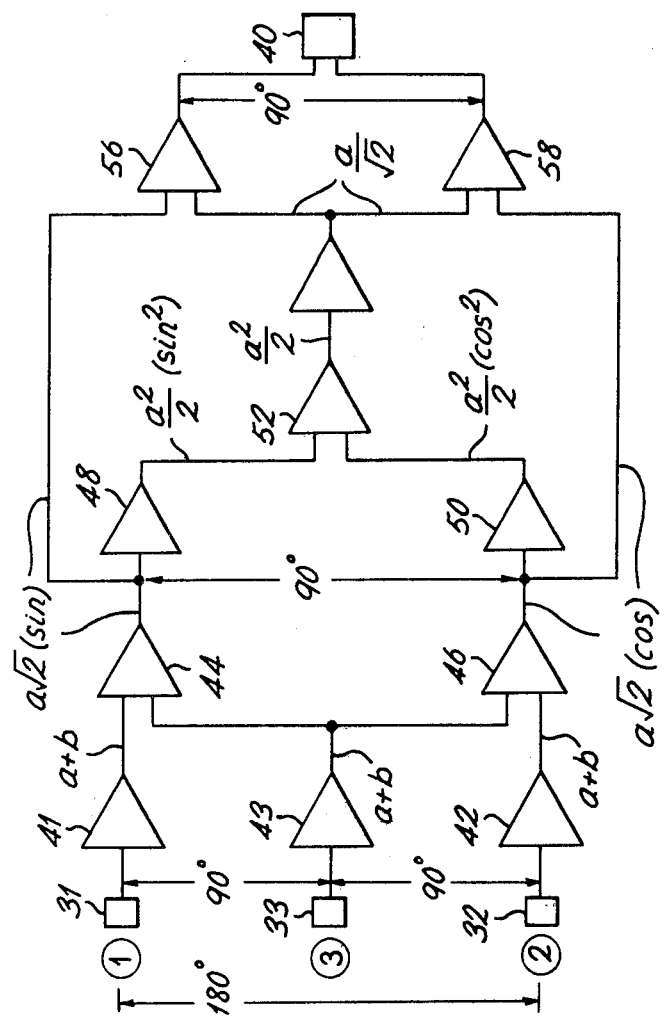

FIGS. 3(a), 3(b) and 3(c) illustrate the effect of subtracting two pairs of signals;

FIG. 4 shows a full optical system incorporating an interferometer according to the invention;

FIG. 5 illustrates a full optical system using corner cubes in place of plane reflectors in the interferometer; and FIG. 6 shows an automatic gain control system, FIG. 1(a) illustrates the output of a photodetector arranged to sense an interferogram. As the path difference between the two interfering beams changes, the output varies between zero, corresponding to complete absence of light, and a maximum on an arbitrary scale. This represents a perfect situation.

Figure 1B:
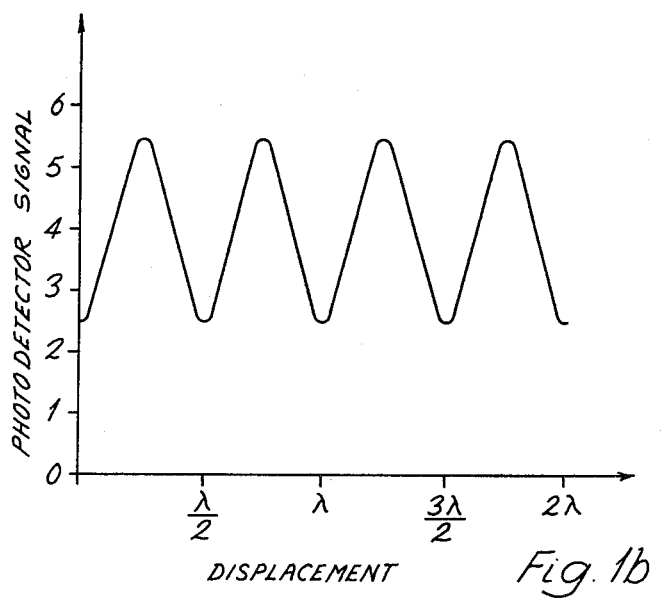
FIG. 1(b) illustrates an interferogram having reduced fringe contrast.

In practice, the output is typically as shown in FIG. 1(b) on the same arbitrary scale; the output signal of the photodetector varies between a maximum, which is less than in the perfect arrangement, and a minimum which is well above the zero level and is due to background illumination. The signal can be regarded as an a.c. component of constant maximum amplitude superimposed on a constant d.c. level. (Normally, neither component will have a constant value).

The problems of using such output signals in conjunction with automatic fringe counting systems have been explained above.

FIG. 2 illustrates schematically an interferometer according to the invention comprising a dielectric interferometer beam splitter 10, and two plane reflectors 12, 14, arranged as a conventional Michelson interferometer. The apparatus further comprises an eighth-wave plate 16 in one of the optical paths, a further beam splitter 18, and two polarising beam splitters 20, 22.

An illuminating light beam 24, for example from a frequency-stabilised laser (not shown) passes through the further beam splitter 18 into the Michelson interferometer, and the further beam splitter also receives one exit beam from the Michelson interferometer and reflects it to the first polarising beam splitter 20. The second polarising beam splitter 22 receives the other exit beam directly from the Michelson interferometer. The entire interferometer according to the invention is indicated by reference numeral 8.

The polarising beam splitters 20, 22, separate the light incident on them into two orthogonally polarised components, P and S, the letters referring to polarisations respectively parallel and perpendicular to the plane of incidence at the beam splitter 10. Each component contains contributions from beams which have travelled through the Michelson interferometer by different routes, and therefore interfere to form interferograms, which may be numbered from 1 to 4 as shown.

The combination of the dielectric beam splitter 10 and the eighth-wave plate 16, through which light passes twice, ensures that the interferograms formed by orthogonal polarisations at each output at 90° out of phase, while the interferograms for the same polarisations at the different outputs are 180° out of phase. For example, interferograms 1 and 4 are 90° out of phase, and interferograms 1 and 2 are 180° out of phase.

If $\alpha_1$ and $\alpha_2$ are the interfering amplitudes in each interferogram and $\Delta$ is their phase difference, then at any part of the overlapping light distributions the resultant intensity is given by:

$$I = \alpha_1^2 + \alpha_2^2 + 2\alpha_1\alpha_2 \cos \Delta \qquad (1)$$

The intensity of the background illumination is given by $\alpha_1^2 + \alpha_2^2$ which determines the d.c. component; the maximum intensity change due to variations of $\Delta$ is $4\alpha_1\alpha_2$, and the maximum a.c. component therefore has a peak-to-peak value of $4\alpha_1\alpha_2$. Thus in each interferogram, the ratio of the a.c. to the d.c. component is determined by the root mean squares of the interfering signals divided by the sum of these signals. The d.c. components due to non-overlapping areas of the beams are, for the moment, neglected.

[NB. In optics, signals are referred to on the basis of their intensity, which equals the square of the amplitude. In electronics, signals are referred to by the value of their amplitude.]

The values of $\alpha$ depend on the reflection and transmission coefficients of the interferometer beam splitter, depending on the path travelled by the interfering beam, and on beam expansion, alignment, etc.

In the interferometer beam splitter 10, let the face nearer the further beam splitter 18 be the "air side" and the face nearer the reflector 14 be the "substrate side", and let the reflectance and transmission coefficients of the interferometer beam splitter be represented by R and T. The six coefficients of the interferometer beam splitter at the two orthogonal directions of polarisations are set out in Table I below FIG. 2. Each value of $\alpha$ is dependent on two coefficients, either on two different coefficients, or twice dependent on the same coefficient. For example a beam having polarisation direction S which is reflected by the interferometer beam splitter 10, reflected by reflector 12, reflected again by beam splitter 10 and passes to the polarising beam splitter 20, the amplitude $\alpha_1$ is given by:

$$\alpha_1 = k_1 A R_s \qquad (2)$$

where A is the initial amplitude of the S component and $k_1$ is a term dependent on beam expansion, alignment, attenuation etc. For a P component beam transmitted by beam splitter 10, reflected by reflector 14 and reflected by beam splitter 10, the amplitude $\alpha_2$ is given by:

$$\alpha_2 = k_2 A \sqrt{R_p^1 T_p} \qquad (3)$$

The amplitudes $\alpha_1$ and $\alpha_2$ for the interfering beams in all four interferograms are given in Table II below FIG. 2, where $k_2$ is a term similar to $k_1$ and the initial amplitude of the P-component is also A. The values of $k_1$ and $k_2$ will be the same only if the beams are of the same size and perfectly aligned, and if there is no relative attenuation. The effect of the further beam splitter 18 is ignored; this does not affect the reasoning. The polarising beam splitters are assumed to be perfect.

It can be seen from Table II that the values $\alpha_1^2 + \alpha_2^2$ for the background illumination and the ratio of a.c. to d.c. components are different for each interferogram. If all values of $\alpha_1^2 + \alpha_2^2$ and the a.c. components were equal, the d.c. component could be removed by subtraction of pairs of signals. The sinusoidal components would not be removed because they are not in phase.

Inspection at Table II shows that three interferogram signals all having equal ratios of a.c. to d.c. components can be provided by selecting the values of some of the 6 coefficients of the interferometer beam splitter 10. Hence it is easy to obtain three signals having equal d.c. components and also equal a.c. components, for example by suitable orientation of the plane of polarisation of the input beam. When this condition is achieved, it can be shown that the d.c. components of the three signals due to non-overlapping areas of the interfering beams are also equal. It is believed that this has not previously been realised, and this selection is the basis for the present invention.

Two alternative possibilities exist:
(a) for equality in interferograms 1, 2 and 3, $$R_s = R_s^1 = T_s \text{ and } R_p = R_p^1 \qquad (4)$$

(b) for equality in interferograms 2, 3 and 4, $$R_p = R_p^1 = T_p \text{ and } R_s = R_s^1 \qquad (5)$$

The dielectric beam splitter 10 is selected to meet one of the two conditions (a) or (b), and from the three output signals from the photodetectors sensing the appropriate interferograms, two pairs of difference signals are provided, and supplied to a conventional fringe counting system.

Usually, the properties of dielectric beam splitters are such that the reflection coefficients on opposite sides of the beam splitter are equal for the same plane of polarisation. Thus the interferograms 2 and 3 will in any case comprise signals having the same ratio of the a.c. to the d.c. component. It follows that it is usually necessary to deliberately select an interferometer beam splitter in which the coefficients of transmission and reflection are equal for one of the two orthogonal polarisation states; this determines whether interferogram 1 or interferogram 4 is used.

It is possible for all six coefficients to be equal but beam splitters with this property are not readily available or easy to manufacture whereas it is fairly easy to equalise R and T for one polarisation.

The effect of subtracting two pairs of signals, each having a constant ratio of the a.c. to the d.c. component and with the same magnitude is illustrated in FIG. 3. The upper part, FIG. 3(a), shows by the chain-dotted, dotted and full lines respectively the outputs from photodetectors arranged to sense the interferograms 1, 2 and 3. The phase difference between interferograms 1 and 3 and between 3 and 2 is 90°, because interferogram 3 is produced by the polarisation orthogonal to that producing 1 and 2; this condition is imposed by the use of a dielectric interferometer beam splitter (which gives a 180° phase difference between interferograms 1 and 2) plus an eighth wave plate in one interferometer arm.

It is essential to subtract signal pairs which differ in phase by 90°, so that the resultants of the subtracted signals also differ in phase by 90°, and can therefore be presented to the fringe counting system. This is illustrated in the vector diagrams in FIG. 3(b)—subtraction of the pair of signals 3 and 1, and the pair of signals 3 and 2 provides resultant signals (3-1) and (3-2) which differ in phase by 90°. This can also be seen in FIG. 3(c) which represents by the chain-dotted and full lines the respective outputs of two subtractor units each arranged to subtract one pair of signals. The subtractors provide a pair of subtraction output signals which vary about a zero level, i.e. which have no d.c. component, and which are in quadrature; this pair of signals fulfils the conditions required by an automatic fringe counting system. With variation about a zero, a suitable constant triggering level is easily chosen.

A full optical system, incorporating an interferometer according to the invention and an automatic fringe counting system is shown in FIG. 4 in which a beam of light 24 from a helium-neon frequency stabilised laser 26 is incident on an interferometer 8 according to the invention through a quarter wave plate 28 and a plane polariser 30; this combination provides an input beam having a plane of polarisation which can be adjusted with respect to the interferometer 8 so that it contains approximately equal components in the P and S directions, which is independent of the polarisation state of the light emerging from the laser 26.

The four interferogram outputs 1 to 4 of the interferometer 8 are each sensed by a photodetector 31, 32, 33, 34 respectively. The outputs of photodetectors 31 and 33 and the outputs of photodetectors 32 and 33 are connected to respective subtractor units 36, 38 which each provide an output which is connected to an automatic fringe counting system 40 of conventional type, which can count fringes corresponding to movement of one of the interferometer reflectors 12, 14. The count is not affected by vibration, etc., and reversal of the movement is possible.

For reasons explained above, it is convenient if the photodetectors receive signals of equal magnitude. One method of providing such signals is to arrange variable attenuators 61, 62, 63, 64 (shown dotted) between the outputs of interferometer 8 and the photocells 31, 32, 33, 34. The settings of the attenuators can be adjusted until three equal signals are supplied to the subtractors 36 and 38.

FIG. 4 illustrates an optical system operating on condition (a), given by equation (4); therefore the output of photodetector 34 is not used. If condition (b), given by equation (5) was used, the appropriate pairs of photodetectors would be connected to the subtractor units.

An alternative interferometer according to the invention is illustrated in FIG. 5; comparison with FIG. 2 will show that the plane mirrors 12, 14 have been replaced by corner cubes 42, 44, and the polarising beam splitter 20 has been replaced by a plane polariser 46. Otherwise, like components have been give the same reference numerals. Selection of interferogram 1 or interferogram 4 is accomplished by changing the orientation of the polariser 46.

It is an advantage of this arrangement that, instead of use of attenuators as in FIG. 4, the interferogram signals may be equalised by altering the plane of polarisation of the polariser 30, so that the two orthogonal components in the incident beam are unequal.

With either the FIG. 2 or the FIG. 5 arrangement of the interferometer, it may be a requirement that the fringes are sub-divided, and sub-divisions of a fringe counted. This can be achieved by setting the trigger levels at values other than zero, but for satisfactory performance the two final signals having 90° phase difference must have constant and equal maximum amplitudes as well as a zero d.c. component. In order to maintain the equal amplitude condition, an automatic gain control system can be used. A suitable system is illustrated in FIG. 6.

The photodetectors 31, 32, 33, are connected to respective amplifiers 41, 42, 43; amplifiers 41 and 43 are connected to difference amplifier 44 and amplifiers 42 and 43 are connected to difference amplifier 46. The difference amplifiers are connected through respective squarers 48, 50 to a summing amplifier 52, the output of which is connected through a square-rooter 54 to one input of each of the two ratio amplifiers 56, 58, the other inputs being supplied directly from the difference amplifiers 44, 46.

Suppose a is the amplitude of the a.c. signal and b is the amplitude of the d.c. signal; then the output of each amplifier 41, 42, 43 will comprise both a and b components. When the output signals of the difference amplifiers 44, 46, are squared by squarers 48, 50, and summed by summing amplifier 52, the sum comprises a signal proportional to the square of the amplitude because the phase difference of 90° between each pair of difference signals reduces the sum to the addition $(sine^2 + cosine^2) \times amplitude^2$. Taking the square root of this sum provides a signal proportional to the peak amplitude of the quadrature input signals and which can be used with the respective ratio amplifiers 56, 58 to provide two output signals in phase quadrature and of constant magnitude. These signals can be supplied to the automatic fringe counting unit 40.

It will be appreciated that the function of the subtractor units 36, 38 in FIG. 4 have been incorporated into the automatic gain control circuit of FIG. 6.

It is to be understood that the apparatus described with reference to the drawings may be modified in several ways.

For example, in place of one of the plane mirrors 12, 14 in FIG. 2, a reflecting surface of a workpiece may be used to derive one or two of the three required interferograms; alternatively, a tilted plane workpiece surface plus a lens may replace one of the corner cubes 42, 44, in FIG. 5. In these arrangements, it is particularly advantageous that the interferometer system can operate when the a.c. signal has fallen from its maximum value by a considerable factor; the factor may be as great as 9.

The invention has been described with reference to the use of a stabilised laser as a light source. This is not essential; an unstabilised laser or a line source such as a cadmium lamp may be used as a source, provided the working distance of the Michelson interferometer is within the coherence length of the chosen source.

Several other changes are possible. Instead of using polarising beam splitters, references 20 and 22 in FIG. 2, a non-polarising beam splitter and two polaroids may be used in each position. By the incorporation of an additional plane reflection in the Michelson interferometer to give parallel working and reference beams, a tilt-measuring system can be provided. Instead of a $\lambda/8$ plate, which is usually extremely fragile, a $3\lambda/8$ plate may be provided. When the additional plane reflector described above is used, it may be designed to provide the required phase conditions.

It would also be possible to arrange the Michelson interferometer so that the beams between the interferometer beam splitter and the reflecting means are at an angle other than 90° without affecting the operation of the invention.

The output from the light source may be circularly polarised by attaching a circular polariser to the source or the interferometer with the advantage that rotation of the source and/or the interferometer system about the axis of the input light beam or axes parallel to it have, in practice, little effect on the instrument performance. In this arrangement the positions of the polariser 30 and the $\lambda/4$ plate 28 in FIG. 5 are interchanged. If the source 26 is already polarised as in the case of most frequency stabilised lasers and lasers with Brewster windows, the polariser 30 may be dispensed with. The $\lambda/4$ plate is then suitably orientated with respect to the plane of vibration of the source. However, optical attenuators as shown in FIG. 4 or different light detector amplifier gains are required.

The two antiphase signals may also be subtracted to provide a d.c.-free signal. This and the two other subtractor signals already available and free of d.c. components can be added or subtracted in all the possible combinations to provide signals or intermediate phases suitable for fringe sub-division. In turn this may be applied indefinitely by similarly adding and subtracting the intermediate phase signals but in practice will be limited by the signal to noise ratios. A method of producing intermediate phase signals has been described in the specification of U.K. Pat. No. 1,345,204 but this has the disadvantage of requiring a number of photodetectors equal to the number of signals and in addition the signals are not free of d.c. components.

The interferometer will usually be used to measure distance, but by measuring the frequency of the fringes in the interferograms, a velocity measurement can be made.

We claim:
1. An improved interferometer system comprising:
   a Michelson interferometer comprising a single interferometer beam splitter and two reflecting means arranged to receive radiation from opposite sides of the beam splitter and to return radiation to the same areas of those sides whereby two exit beams of radiation are provided, one from each side of the beam splitter;

a beam splitting and polarising means arranged to receive one exit beam and to separate the received radiation into radiation at two orthogonal directions of polarisation whereby two optical interferograms are provided;

means arranged to receive the other exit beam and to separate from it radiation at one of said orthogonal directions of polarisation whereby a third optical interferogram is provided, the third interferogram being in phase quadrature with one of the first and second interferograms, and being in antiphase with the other of the first and second interferograms;

characterised in that the single interferometer beam splitter has for radiation at each orthogonal direction of polarisation reflection coefficients on its two faces which are equal, and has for radiation at one orthogonal direction of polarisation a transmission coefficient which is equal to the reflection coefficient, whereby the two reflecting means each receive and return radiation having components at both orthogonal directions of polarisation.

2. An improved interferometer system comprising:

a Michelson interferometer comprising a single interferometer beam splitter and two reflecting means arranged to receive radiation from opposite sides of the beam splitter and to return radiation to the same areas of those sides whereby two exit beams of radiation are provided, one from each side of the beam splitter;

a beam splitting and polarising means arranged to receive one exit beam and to separate the received radiation into radiation at two orthogonal directions of polarisation whereby two optical interferograms are provided;

means arranged to receive the other exit beam and to separate from it radiation at one of said orthogonal directions of polarisation whereby a third optical interferogram is provided, the third interferogram being in phase quadrature with one of the first and second interferograms, and being in antiphase with the other of the first and second interferograms;

said single interferometer beam splitter having for radiation at each orthogonal directional of polarisation reflection coefficients on its two faces which are equal, and having for radiation at one orthogonal direction of polarisation a transmission coefficient which is equal to the reflection coefficient;

three photodetection means arranged to receive the three interferograms and to provide three electrical signals in the same phase relationship as the interferograms from which they are derived, and signal subtraction means arranged to subtract the signal pairs which are in phase quadrature, whereby two alternating output signals are provided having zero d.c. component.

3. An interferometer system according to claim 1 or 2 in which the two reflecting means each comprise a plane reflector, there being a second beam splitting and polarising means, and the means to receive the other exit beam comprises a further beam splitter arranged to reflect that beam to said second beam splitting and polarising means.

4. An interferometer system according to claim 1 or 2 in which the two reflecting means each comprise a retro-reflector and the means to receive said other exit beam comprises a polariser (46) arranged to allow passage of light in one of the two orthogonal directions.

5. An interferometer system according to claim 1 further comprising three photodetection means arranged to receive the three interferograms and to provide three electrical signals in the same phase relationship as the interferograms from which they are derived, and signal subtraction means arranged to subtract the signal pairs which are in phase quadrature, whereby two alternating output signals are provided having zero d.c. component.

6. An interferometer system according to claim 5 or 2 further comprising means to maintain the two output signals at constant and equal maximum amplitudes.

7. An interferometer system according to claim 6 in which the means to maintain the two output signals at constant and equal maximum amplitudes is an automatic gain control system which comprises three amplifiers connected one to each photodetection means; two difference amplifiers to which pairs of amplifier output signals in phase quadrature are connected; squaring and summing means connected to the outputs of the difference amplifiers; square-rooting means connected to the output of the summing means; two ratio amplifiers both connected to the output of the square-rooting means and respectively connected to the outputs of the difference amplifiers and automatic fringe counting means connected to the outputs of the ratio amplifiers.

* * * * *